H. H. HEWITT.
CAR TRUCK.
APPLICATION FILED JUNE 2, 1914.
1,259,624.
Patented Mar. 19, 1918.
2 SHEETS—SHEET 2.
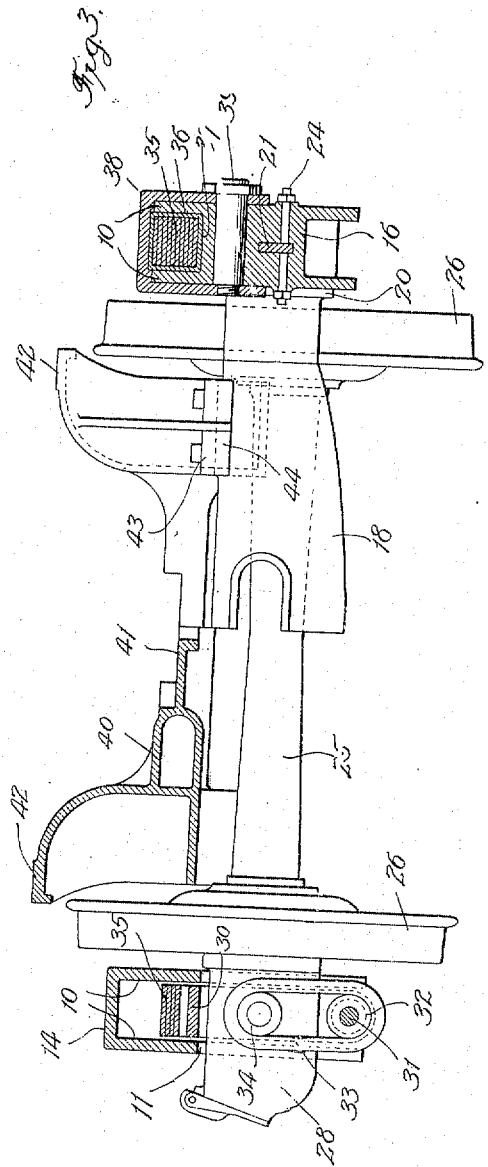
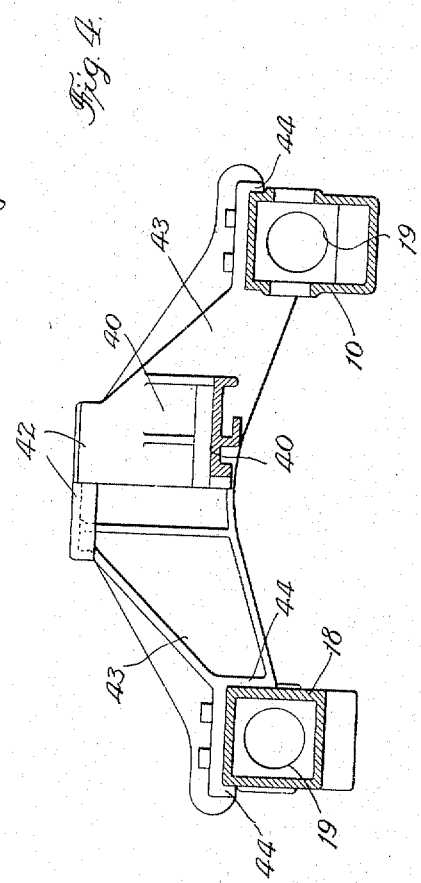

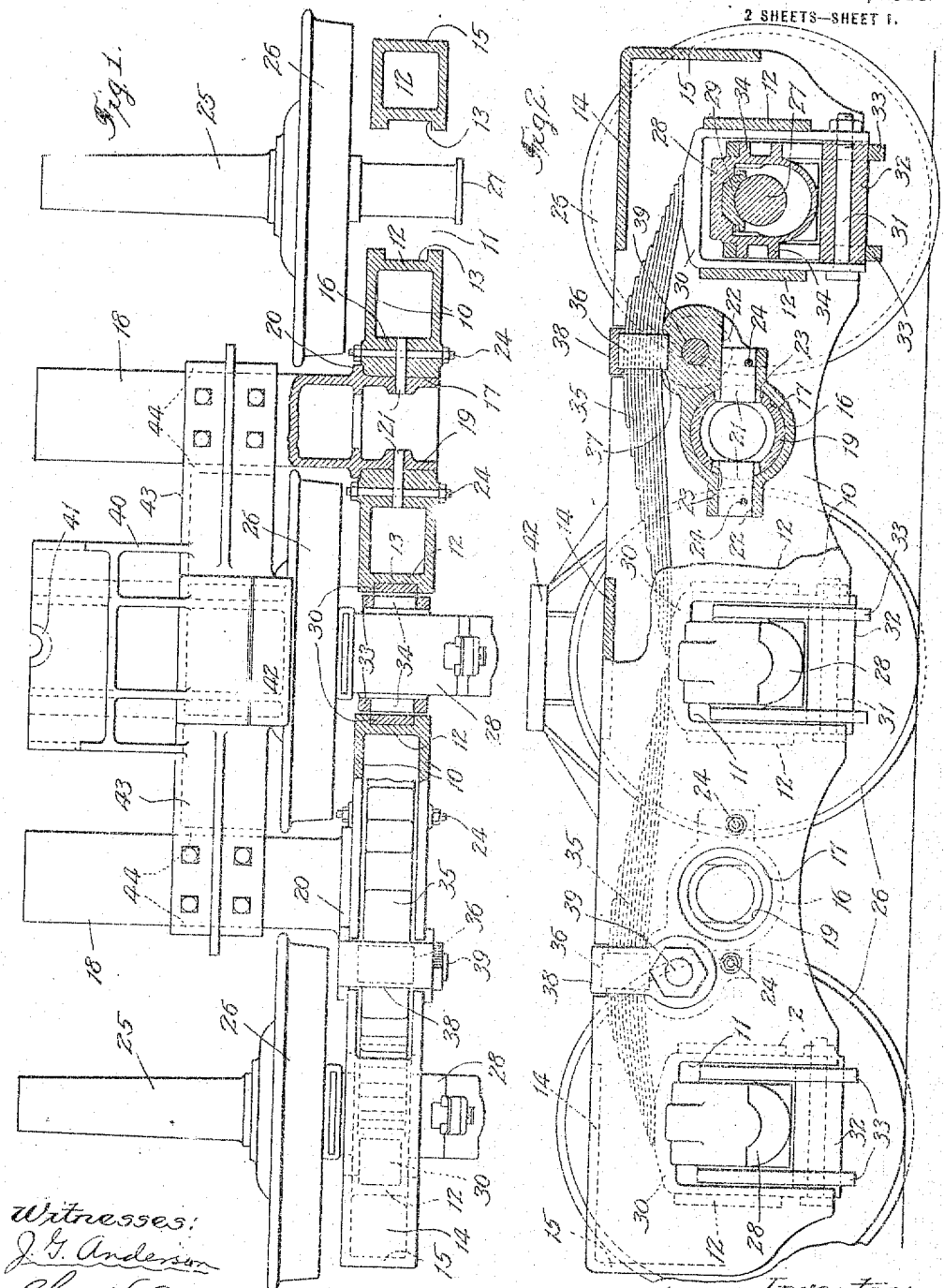

UNITED STATES PATENT OFFICE.

HERBERT H. HEWITT, OF BUFFALO, NEW YORK.

CAR-TRUCK.

1,259,624.  Specification of Letters Patent.  Patented Mar. 19, 1918.

Application filed June 2, 1914.  Serial No. 842,377.

*To all whom it may concern:*

Be it known that I, HERBERT H. HEWITT, a citizen of the United States, and a resident of Buffalo, county of Erie, and State of New York, have invented certain new and useful improvements in Car-Trucks, of which the following is a full, clear, and exact description.

The present invention relates to railway car trucks and seeks to simplify and improve the construction of the truck and to provide improved means for equalizing the load on the axles of the truck and for yieldingly supporting the truck frame from the axles. A further object of the invention is to provide improved means for permitting independent axial movement of the wheel axles relatively to the truck frame. Certain features of the invention are particularly applicable to a truck having three or more wheel axles, and a further object of the invention is to provide an improved frame for six-wheel car trucks.

The invention consists in the features of improvement hereinafter set forth, illustrated in the accompanying drawings and more particularly pointed out in the appended claims.

Figure 1 is a partial plan view of the improved truck with portions of one of the side frames shown in horizontal section. Fig. 2 is an elevation with parts of the side frame shown in vertical section. Fig. 3 is a cross section of the improved truck, and Fig. 4 is a detail view of the truck transoms and spider.

The drawings illustrate a six-wheel truck to which certain features of the invention are particularly applicable, one of the objects of the invention being to provide a six-wheel truck of simplified construction and which can be constructed with a short wheel base if desired.

The side frames are preferably made somewhat in the form of box girders and can be conveniently made of cast steel. Each side frame comprises inner and outer side walls 10 which are provided with central and end pedestal openings or jaws 11 for receiving the journal boxes of the wheel axles. At the opposite side edges of the pedestal openings or jaws 11, the side walls of each side frame are connected by integral vertical walls 12 which are spaced from the edges of the openings so that the latter are provided with suitable guide-ways 13. The side walls are also connected above the openings 11 and at their upper edges by integral horizontal walls 14 which merge into vertical walls 15 at the ends of the side frame and which are also integral with the side walls 10. Intermediate the pedestal jaws, the side walls of each side frame are connected by irregular integral portions 16 having openings 17 extending therethrough, which are preferably cylindrical. The side frames are preferably connected by two transoms 18 having end portions adapted to extend within the openings 17 of the side frames. Preferably, the transoms 18 are provided with somewhat reduced, cylindrical, journal ends 19 which extend within the cylindrical bearing openings 17 of the side frames. Preferably, also, as shown, the transoms are formed of hollow steel castings and are provided with flanges 20 which, as most clearly shown in Fig. 1, abut against the inner faces of the side frame.

The side frames are detachably connected to the ends of the transoms preferably by keys 21 which are arranged transverse to the axes of the transoms. In the form shown, the walls of the bearing openings 17 and the cylindrical ends 19 of the transoms are provided with suitable pockets 22 and 23 for receiving the securing keys 21, the latter being held in place by bolts 24 extending through the portions 16 of the side frames and through openings formed in the keys 21. The openings 23 in the walls of the cylindrical ends 19 of the transoms are slightly longer than the width of the locking keys 21, so that flexible connections are provided between the side frames and the ends of the transoms. By the improved construction described, the side frames are securely but detachably connected to the transoms, and the construction serves to hold the parts of the truck frames at all times in proper, square form. But, inasmuch as the transom ends are journaled in the bearing openings 17 of the side frames, and inasmuch as the openings 23 are slightly longer than the width of the locking keys 21, there will be a certain amount of vertical flexibility between the parts of the truck frame which will prevent them and the connections between them from being wrenched or strained when the truck is running over an uneven track.

The wheel axles 25 are provided, as usual, with wheels 26 and projecting journals 27 arranged within suitable journal boxes 28. Each journal box is preferably formed of an integral body of metal and is provided with a bearing or brass 29 engaging the journal 27 of the car axle. Each journal box is arranged within one of the pedestal jaws or openings 11 of the truck frame and in accordance with the present invention, is preferably movably mounted therein to permit the independent transverse axial movement of the wheel axles. The journal boxes are also preferably so mounted as to permit the independent rocking movement of the wheel axles in transverse vertical planes.

For this purpose, each journal box is movably connected to and supports a yoke 30 of inverted U-shape, which is arranged to shift vertically in guide-ways 13 of the pedestal jaws. The yokes are of inverted U-shape, as stated, and are preferably formed of steel. The lower ends of the members of each yoke are connected by a bolt 31 and are held apart in proper spaced relation by a cylindrical sleeve 32. Swinging supports are interposed between the yokes and the journal boxes and these supports are preferably in the form of open links 33 having semicircular upper and lower ends. The lower ends of the links extend around the cylindrical sleeves 32 and the upper ends of the links extend over laterally projecting trunnions 34 integrally formed upon the side walls of the journal boxes 28. In this way, the hanger links sustain the yokes 30 and at the same time, the wheel axles are free to shift in an axial direction independently of one another and of the side frames and in a direction substantially at right angles to the side frames, the links 33 being arranged to swing in planes parallel to the axles and substantially at right angles to the side frames of the truck.

Suitable spring supporting means are interposed between the yokes 30 and the side frames for yieldingly carrying the latter. The supporting means is also arranged to equalize the load on the axles of the truck. In accordance with the preferred embodiment of the invention, each side frame, in the six-wheel truck shown, is sustained by a pair of springs 35 which extend longitudinally between the yokes 30, the springs being arranged within the upper portion of the chambered side frames between the side walls 10 thereof. Each spring 35 comprises a set of leaves held together by a spring band 36. Each spring band is mounted on a suitable seat 37 formed upon the integral portion 16 of the side frame, and a yoke or stirrup 38 extending over the spring band is connected to the portion 16 of the side frame by a transverse bolt 39. The upper edges of the walls 10 of the side frame are cut away to admit the upper, transverse, horizontal portion of the yoke or stirrup. In this way, the springs 35 are carried or supported by the yokes 30, which in turn are supported from the wheel axles and the side frames of the truck are suspended from the springs by means of the stirrups 38. The springs are what may be termed "lever" springs and are provided with relatively long and short arms. In the six-wheel truck shown, the inner arms of the springs are twice as long as the outer arms, so that the load on the three wheel axles of the truck is equalized.

The longitudinally extending lever springs obviate the necessity of employing the usual equalizer bars and coil springs mounted thereon. Furthermore, the applicant's lever springs, each made up of a set of leaves, avoids the necessity of employing two sets of springs, as in the ordinary equalizer truck. By obviating the ordinary coil spring used in equalizer trucks, the number of parts is reduced, the truck is of such construction that it may be formed with a short wheel base and for that reason is well adapted for use under tenders and, at the same time, the short, jerky movement of the equalizer springs of the ordinary truck is obviated and an easier riding truck is provided. The equalizing springs also serve to distribute the load properly upon the wheel axles.

Inasmuch as the wheel axles are free to shift independently in axial direction, the transversely swinging spring plank of the ordinary equalizer truck can be omitted and the car can be supported directly from the transverse connecting means or transoms between the truck side frames.

In the construction shown, the spider 40, having a central bearing 41 and raised side bearings 42, is mounted directly on the truck transoms 18. As shown, the spider is provided with projecting arms 43, the ends of which are bolted to the transoms and which are also preferably provided with depending flanges 44 for engaging the edges of the transoms. Preferably, as shown, the spider 40, including the center bearing 41, side bearings 42 and arms 43, are formed of a single integral casting.

In the ordinary equalizer truck, the lateral thrusts or bolts on the truck wheels are imparted to the truck frame and are taken up by the swinging truck bolsters. In the present improved construction, the small and numerous lateral thrusts or blows are taken up separately by each pair of wheels without transmitting the motion to the truck frame, so that the strain upon the wheels, wheel axles and truck frame is greatly decreased and wear and tear upon the wheel flanges and journaled brasses is reduced to a minimum. Furthermore, this independent movement of the wheel axles is particularly advantageous in a car truck having three or more wheel axles, since the wheel axles may shift relatively to one another in axial direction when the car rounds a curve. In the ordinary six-wheel truck, it has been found necessary to use short journal boxes for the bearings of the center axle in order to prevent binding between the bearings and the shoulders at the ends of the axle journals when the truck is on a curve. With the present construction, the wheel axles can readily adjust themselves relatively to one another when the truck is on a curve and full size bearings may be employed without danger that there will be any binding between the ends of the bearings and the shoulders of the axle journals.

It is obvious that many changes may be made in the details set forth without departure from the essentials of the invention as defined in the claims. While the invention is particularly applicable to car trucks having three or more wheel axles, it is obvious that certain of the features thereof may be employed in connection with four-wheel trucks. It should also be noted that parts of the invention may be taken without its adoption in its entirety.

I claim as my invention:—

1. A car truck comprising truck side frames having pedestal jaws and transom openings between said jaws, a truck transom having end portions engaging said openings and connected to said side frames, wheel axles, journal boxes therefor arranged within said pedestal jaws, and equalizer spring levers extending longitudinally between said journal boxes and over the ends of said transom, said spring levers being supported at their ends by said journal boxes and being connected intermediate their ends to said side frames.

2. In a six wheel, bogie truck, the combination with truck side frames, transverse car supporting means extending between and connecting said side frames and provided with a center bearing, wheel axles, journal boxes therefor, and pairs of lever springs for carrying said side frames extending longitudinally between said journal boxes and supported thereby, said lever springs having arms of different lengths to equalize the load upon the outer and intermediate wheel axles.

3. In a six-wheel truck, the combination with the truck frame, wheel axles, journal boxes therefor, and lever springs extending longitudinally between said journal boxes and supported at their ends thereby, said springs being connected intermediate their ends to said truck frame and having relatively long and short, inner and outer arms to equalize the load on said wheel axles.

4. A truck having six or more wheels and comprising connected side frames having pedestal jaws, wheel axles, journal boxes therefor arranged in said jaws, and two or more leaf springs for carrying each side frame extending longitudinally between said journal boxes and supported thereby, said springs having relatively long and short arms for equalizing the load on said wheel axles.

5. A six wheel bogie truck comprising side frames having pedestal jaws, transverse car supporting means extending between said side frames and provided with a center bearing, wheel axles, journal boxes therefor arranged in said jaws, a pair of equalizing springs for carrying each side frame, each of said springs extending continuously and longitudinally between two of said journal boxes and being supported at their ends thereby, said side frames being chambered to receive said springs, and yokes pivotally connected to said side frames and extending over said springs intermediate the ends of said springs.

6. A car truck comprising a truck frame having pedestal jaws, yokes guided in said jaws, wheel axles, journal boxes therefor movably connected to and supporting said yokes, and frame-supporting equalizer springs extending longitudinally between said yokes.

7. A car truck comprising a truck frame having pedestal jaws, yokes guided in said jaws, wheel axles, journal boxes therefor, supporting links pivoted to said journal box and to said yokes to permit the independent axial movement of said wheel axles, and frame supporting springs extending longitudinally between said yokes.

8. A six-wheel car truck comprising connected side frames having pedestal jaws, yokes guided in said jaws, wheel axles, journal boxes therefor movably mounted in and supporting said yokes in manner permitting the independent axial movement of said wheel axles, and longitudinally extending, equalizer lever springs connected to said side frames and having relatively long and short, inner and outer arms mounted on said yokes.

9. A six-wheel truck comprising rigid side frames having pedestal jaws, two transoms connecting said side frames, a supporting spider mounted on said transoms, yokes guided in said jaws, wheel axles, journal boxes therefor, supporting links for said yokes pivotally connected thereto and to said journal boxes to permit the independent axial and transverse rocking movement of said wheel axles, and pairs of equalizing lever springs connected to said side frames and having relatively long and short, inner and outer arms mounted on said yokes.

10. A bogie car truck comprising side frames, transverse car supporting means connecting said side frames and held against lateral movement with respect thereto, said transverse car supporting means being provided with a center bearing, wheel axles, journal boxes for said wheel axles, carrying springs for said side frames, spring supporting yokes extending over said journal boxes, and hanger links extending between said journal boxes and the lower ends of said yokes, said links being arranged to swing in vertical planes parallel to said wheel axles to permit the independent axial movement thereof at right angles to said side frames.

11. A six-wheel car truck comprising side frames, car supporting means connecting said side frames, three wheel axles, journal boxes therefor, and equalizing supporting means interposed between said side frames and said journal boxes and arranged to permit the independent axial shift of said wheel axles.

12. A six-wheel car truck comprising six frames, two transoms connecting said side frames, a car supporting spider mounted directly on said transoms, three wheel axles, journal boxes therefor, and equalizing supporting means, including frame carrying springs, interposed between said journal boxes and said side frames and arranged to permit the independent axial and transverse rocking movement of said wheel axles.

13. A six-wheel bogie car truck comprising a truck frame, car supporting center and side bearings carried by said frame and held against relative lateral movement, three wheel axles, and equalizing supporting means interposed between said frame and said wheel axles and arranged to permit the independent axial movement of said wheel axles.

14. A six-wheel bogie car truck comprising a truck frame, car supporting center and side bearings carried by said frame and held against relative lateral movement, three wheel axles, journal boxes therefor, and equalizing supporting means including carrying springs and swinging links interposed between said frame and said journal boxes, said links being arranged to swing in transverse vertical planes to permit the independent transverse movement of said wheel axles.

15. A car truck comprising a truck frame having pedestal jaws, yokes vertically guided in said jaws, spring supporting means interposed between said yokes and said frame, wheel axles, and journal boxes therefor movably connected to said yokes in manner permitting the independent axial movement of said wheel axles.

16. A car truck comprising a truck frame having pedestal jaws, yokes vertically guided in said jaws, spring supporting means interposed between said yokes and said frame, wheel axles, journal boxes therefor, and hanger links pivotally connected to said yokes and said journal boxes and arranged to swing in transverse vertical planes.

17. A car truck comprising a truck frame having pedestal jaws, yokes vertically guided in said jaws, spring supporting means interposed between said yokes and said frame, wheel axles, journal boxes therefor having side trunnions and arranged within said yokes, and pairs of hanger links pivotally engaging and depending from said trunnions and pivotally connected at their lower ends to the lower ends of said yokes.

18. A six-wheel, bogie car truck comprising side frames having pedestal jaws, car supporting means connecting said side frames and held against relative lateral movement, yokes guided in said jaws, equalizing spring supporting means connected to said side frames and carried upon said yokes, wheel axles, journal boxes therefor arranged within said yokes and having side trunnions, and pairs of vertical hanger links pivotally engaging said side trunnions and the lower ends of said yokes.

19. In a six wheel car truck, the combination of side frames, two transoms connected to said side frames against relative endwise movement, a car supporting spider mounted directly on and secured to said transoms, three wheel axles, journal boxes therefor, and equalizing supporting means, including frame carrying springs, interposed between said side frames and said journal boxes and arranged to permit the lateral movement of said side frames relatively to said wheel axles.

20. In a six-wheel truck, the combination of substantially rigid side frames having central and end openings for receiving the journal boxes and openings intermediate said central and end openings, and connecting transoms having reduced ends fitting within said openings, and suitable means detachably connecting said side frames and said transoms.

21. In a six wheel truck, the combination of substantially rigid side frames having central and end openings for receiving the the journal boxes and openings intermediate said central and end openings, and connecting transoms having reduced ends fitting within said openings, and bolts arranged transverse to the axes of said transoms and detachably connecting the ends of the latter to said side frames.

22. In a six-wheel truck, the combination of rigid one-piece side frames having central and end openings for the journal boxes and having cylindrical openings intermediate said central and end openings, and two transoms having cylindrical ends journaled within said cylindrical openings of said side frames and detachably connected thereto.

23. In a six-wheel truck, the combination of rigid one-piece side frames having central and end openings for the journal boxes and having cylindrical openings intermediate said central and end openings and two transoms having cylindrical ends journaled within said cylindrical openings of said side frames, said cylindrical opening and transom end having pockets in the side walls thereof, and bolts in said pockets for detachably connecting said side frames and transoms.

24. A six-wheel truck comprising side frames having pedestal jaws and openings intermediate said jaws, two transoms having their end portions detachably secured within said intermediate openings, a car-supporting spider mounted directly on said transoms, yokes guided in said pedestal jaws, wheel axles, journal boxes connected to said yokes in manner permitting the independent endwise and rocking movements of said wheel axles, and pairs of longitudinally extending, equalizing lever springs connected to said side frames and having relatively long and short inner and outer arms supported on said yokes.

25. A car truck, comprising truck side frames having pedestal jaws, transom openings between said jaws and spring seats above said transom openings, a truck transom having its end portions arranged within said openings and connected to said side frames, wheel axles, journal boxes therefor arranged within said pedestal jaws, equalizer spring levers resting on said spring seats extending longitudinally between said journal boxes and supported at their ends thereby, and yokes for connecting said springs intermediate their ends to said seats.

26. In a car truck, the combination of chambered side frames each comprising connected inner and outer side walls and having pedestal jaws and intermediate transom openings, a truck transom having its end portions arranged within said openings and connected to said side frames, wheel axles, journal boxes therefor arranged within said pedestal jaws, and equalizing supporting means, including frame carrying springs interposed between said journal boxes and said side frames, said equalizing supporting means being arranged within the upper portions of said chambered side frames, each of said side frames, including the pedestal jaws thereof, being formed of an integral casting.

27. In a car truck, the combination of chambered side frames each comprising connected inner and outer side walls and having pedestal jaws and intermediate transom openings, a truck transom having its ends arranged within said openings and connected to said side frames, wheel axles, journal boxes therefor arranged within said pedestal jaws, and equalizing lever springs arranged within said chambered side frames above said transom openings and extending longitudinally between said journal boxes, said lever springs being supported at their ends by said journal boxes and being connected intermediate their ends to said side frames.

28. In a car truck, the combination of chambered side frames each comprising connected inner and outer side walls and having pedestal jaws, intermediate transom openings and spring seats above said openings, wheel axles, journal boxes therefor arranged within said pedestal jaws, equalizing lever springs arranged within said chambered side frames and extending longitudinally between said journal boxes, said lever springs being supported at their ends by said journal boxes and engaging said spring seats intermediate their ends, and yokes for holding said springs in place upon said seats.

29. In a car truck, the combination of chambered side frames comprising connected inner and outer side walls having pedestal jaws and transom openings intermediate said jaws, a truck transom having its ends arranged within said openings and connected to said side frames, yokes guided in said pedestal jaws, supporting springs arranged within said chambered side frames and carried by said yokes, wheel axles, journal boxes therefore arranged within said yokes, and transversely swinging hangers interposed between said journal boxes and said yokes.

HERBERT H. HEWITT.

Witnesses:
J. G. ANDERSON,
J. H. PEIRCE.